United States Patent Office 3,072,077
Patented Jan. 8, 1963

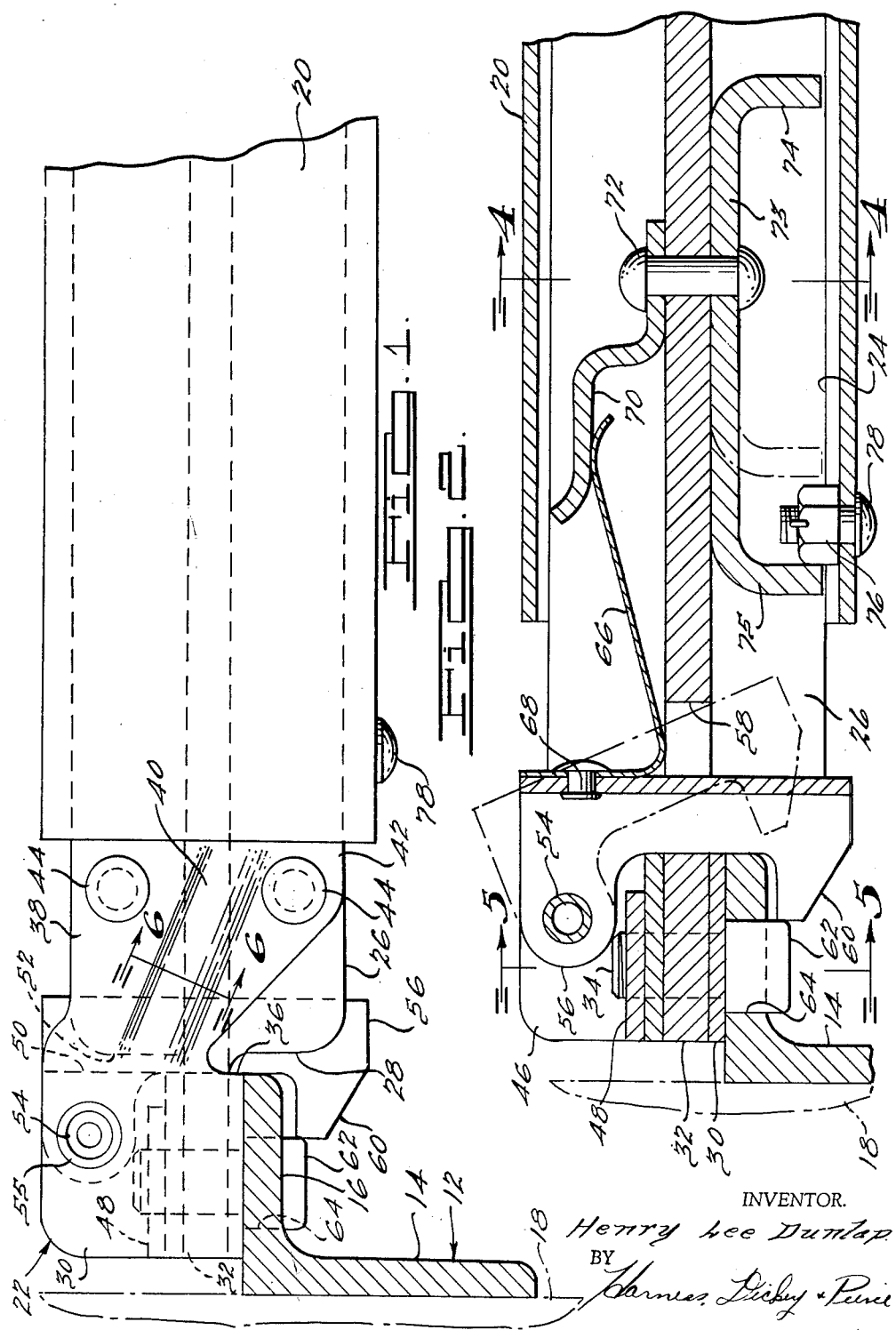

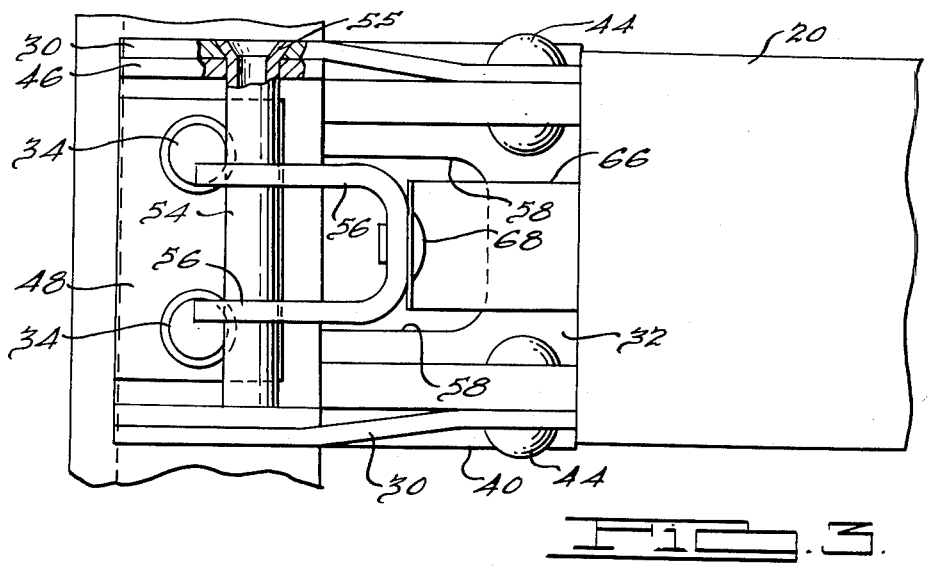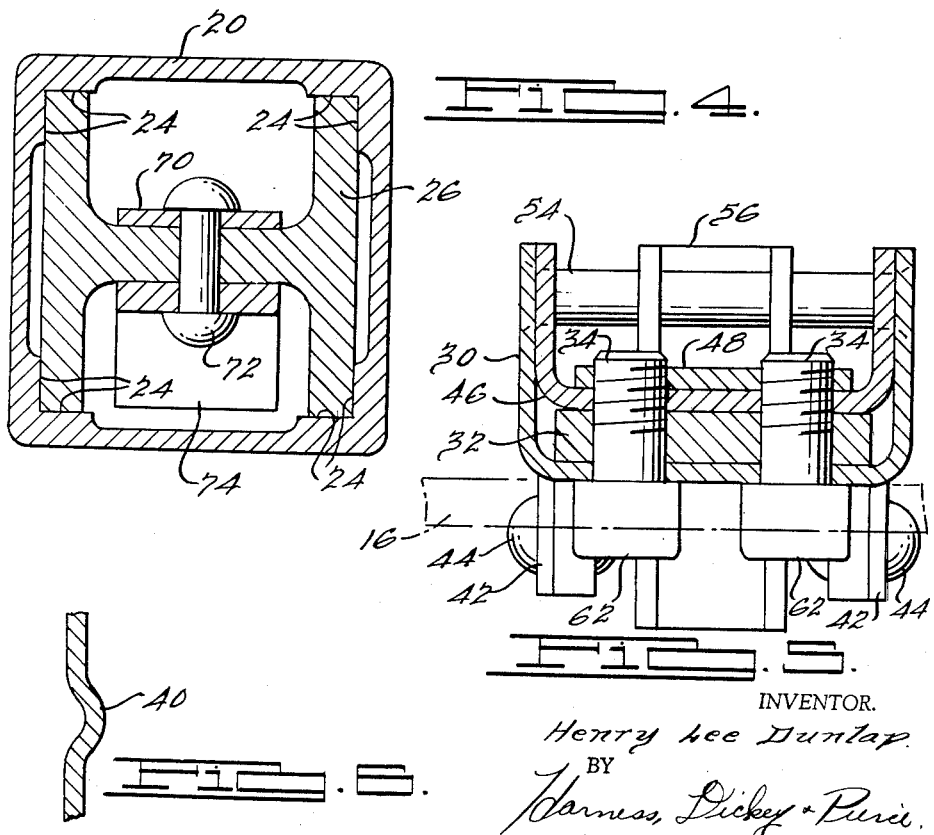

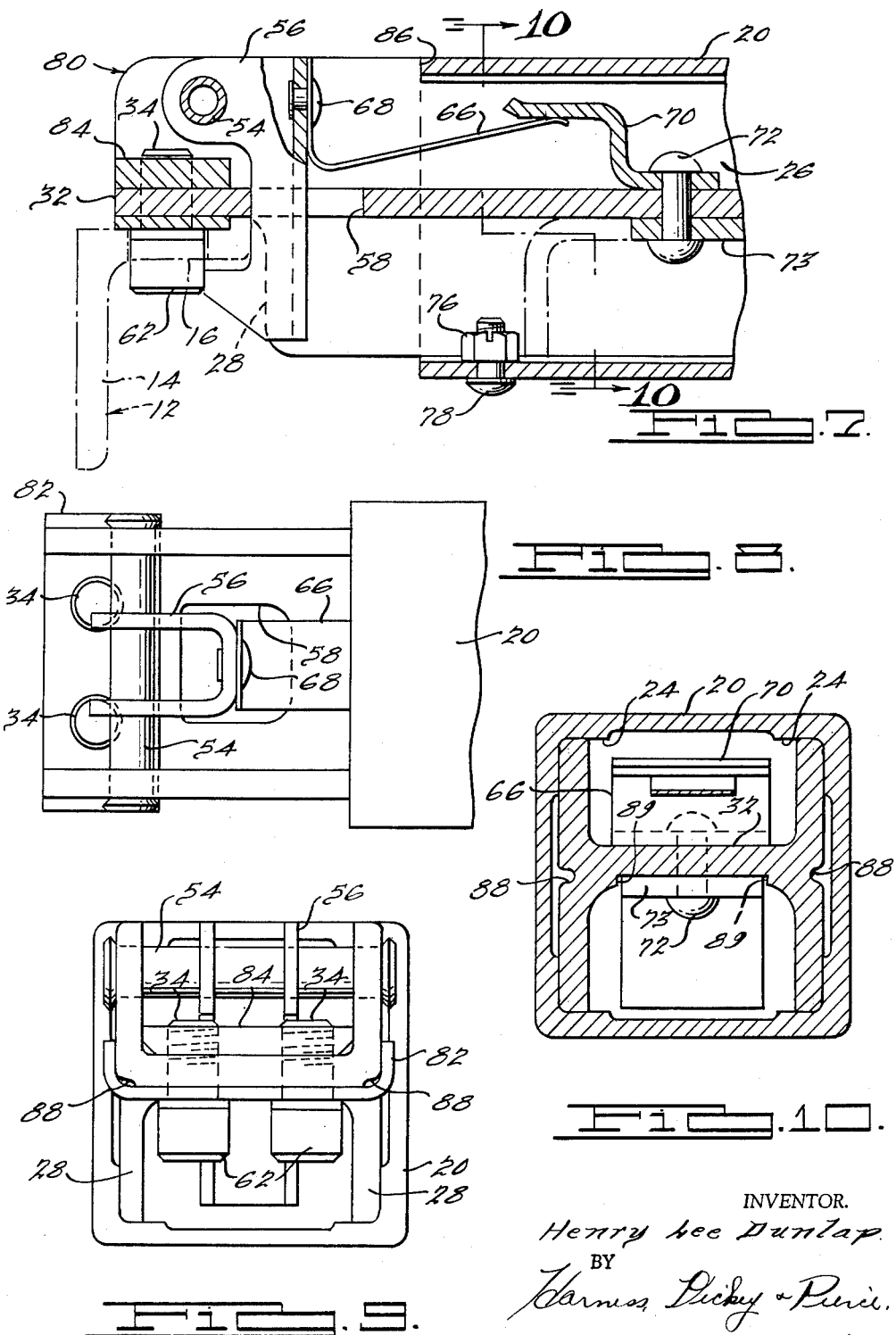

3,072,077
CARGO BRACING BAR
Henry L. Dunlap, Dearborn, Mich., assignor to Evans Products Company, Plymouth, Mich., a corporation of Delaware
Filed Aug. 5, 1958, Ser. No. 753,219
17 Claims. (Cl. 105—369)

This invention relates to cargo bracing equipment such as commonly used in trucks, railroad freight cars, ships and storage compartments in general where it is desired to hold articles of freight in a proper position so as to prevent damage to them. In particular, the invention refers to an improved cargo or freight bracing bar. It is related to that which is disclosed and claimed in a copending application, Serial No. 545,195, filed November 7, 1955, now Patent No. 2,879,721, dated March 31, 1959, and assigned to the assignee hereof and refernce to that application as well as its parent cases, now Patents Nos. 2,497,683 and 2,725,826, will show in much greater detail the nature of the freight bracing equipment and systems in which the present invention may be employed.

The freight or cargo bracing bars used in freight bracing systems are provided with means at opposite ends to enable them to be quickly attached to and removed from suitable support elements in the freight storage compartment. In the case of moving vehicles, the attaching means must be designed to positively hold the bar in place in spite of rather severe and sudden forces that may be applied to it in many different directions. It is also imperative that the attaching means be designed so that it can be readily connected to and disconnected from the support elements by workers with absolutely no training or mechanical skill. Further, it must be rugged enough to withstand rough usage and abuse, and yet be light enough in weight to make its use practical.

With the foregoing requirements in mind, it is an object of the invention to provide a strong, rugged, lightweight attaching means for the ends of a freight bracing bar which will automatically position itself in an operative or latching position, but which automatically retracts while the bar is being connected to a support element.

It is a further object of the invention to provide a positive latch for a cargo bar designed so that loads on it tend to drive it more firmly into latching position.

Another object of the invention is to provide an attachment means embodying structure which accomplishes the above objects and the major components of which may be inexpensively manufactured from lightweight aluminum to make the attachment means more practical.

Another object of the invention is to provide a cargo bar having an attachment means made up of extruded aluminum reinforced at various contact points so that it can withstand the various impact loads to which it is subjected in use.

Other objects and features of the invention will become apparent upon consideration of the accompanying drawings, wherein:

FIGURE 1 is a broken side elevation of one form of the invention;

FIGURE 2 is a longitudinal sectional view of the cargo bar of FIGURE 1;

FIGURE 3 is a broken plan view of the cargo bar of FIGURE 1;

FIGURE 4 is a cross section, taken along the line 4—4 of FIGURE 2;

FIGURE 5 is a cross section, taken along the line 5—5 of FIGURE 2;

FIGURE 6 is a sectional view, taken along the line 6—6 of FIGURE 1;

FIGURE 7 is a longitudinal sectional view similar to FIGURE 2 illustrating a modified form of the invention;

FIGURE 8 is a broken plan view of the cargo bar of FIGURE 7;

FIGURE 9 is an end view of the cargo bar of FIGURE 7, taken from the left-hand end thereof; and, FIGURE 10 is a cross section, taken along the line 10—10 of FIGURE 7.

As described in more detail in the patents and application referred to above, the freight or cargo bracing bar of this invention (sometimes also referred to as "cross" bar) is preferably used in connection with a support element 12 of angular shape having a vertical flange 14 and a horizontal flange 16. In the case of a freight car, truck or trailer, the support elements 12 are located in pairs on opposite sides of the body and extend longitudinally fore and aft of the body, being ordinarily parallel to the floor and secured in a fixed manner, as by welding, to the side wall structure 18 of the body.

The support elements 12 in a pair are commonly referred to as a "belt line" and are nearly always on the same level, that is, located the same distance above the floor of the body. The cross bar 20 will have an end fitting 22 at each end which is adapted to be connected to the support element 12 so that the cross bar can extend transversely across the body.

While the structure just described represents a very common arrangement and application for cross bars of the present invention, it will be understood that the invention can be used in various other ways.

As most clearly illustrated in FIGURE 4, the cross bar 20 is preferably made from extruded aluminum square tubing having bearing surfaces or pads 24 extruded therewith at the four interior corners. If the tubing is accurately extruded, it is not necessary to machine the pads 24. However, if desired, the pads may be broached adjacent the ends of the cross bar 20 in order to control the inside dimension to provide a close tolerance fitting for the end fitting 22. It is apparent that it is only necessary to broach the pads 24 at each end and only deep enough longitudinally to accept the end fittings.

Referring to FIGURES 1 through 6, the end fitting 22 is comprised of a body member in the form of an H-sectioned extrusion 26 of a lightweight metal such as aluminum having the downwardly extending vertical legs thereof cut away adjacent one end thereof as at 28 to permit a channel-shaped member 30 to be fitted over the end thereof. As most clearly illustrated in FIGURE 1, the web of the member 30 lies against the under side of the web 32 of the extrusion 26 and terminates at point 36 while legs 38 of the member 30 extend further to the right and have a strengthening bead 40 formed therein as most clearly illustrated in FIGURE 6. It will be observed that a portion of the web of the member 30, which is cut away, is bent downwardly to form downwardly projecting skirts 42 to enable the member 30 to be affixed to the legs of the extrusion 26 by rivets 44, or other suitable means.

A second channel-shaped member 46 is positioned within the member 30 with the legs thereof welded or otherwise secured to the legs of the member 30 and with the web thereof resting on top of the web 32 of the extrusion 26. Threaded studs 34 pass through the webs of the members 30 and 46 and the web 32 of the extrusion 26 to rigidly secure them together and a plate 48 is welded to the upper surface of the web of the channel 46 to provide additional material which may be internally threaded to receive the threaded pins 34.

As viewed in FIGURE 1, the right edge of the member 46 terminates at 50 to clear the upwardly extending legs of the extrusion 26 which are cut away as at 52. In this manner, the legs of the member 46 can be more widely spaced than the legs of the extrusion 26 so as to abut against the legs of the member 30 to provide the necessary thickness for supporting a pin or hollow tube 54. Flanges 55 are formed on the ends of the pin 54 to retain them against axial movement. A channel-shaped latch 56, preferably made of sheet metal, is pivotally mounted on the pin 54 and extends through an aperture 58 in the web 32 of the extrusion 26 so that a hook portion 60 on the lower end thereof can engage the under side of the flange 16 of the support member 12 to lock the end fitting 22 in engagement with the support member 12.

It will be observed that studs 34 have slightly enlarged cylindrical projecting portions 62 which engage holes 64 formed in the flange 16, the cylindrical projections being spaced apart in the preferred embodiment illustrated by a distance equal to the spacing of the holes 64.

As most clearly illustrated in FIGURE 2, one end of a flat spring 66 is fastened to the web of the latch 56 by a rivet 68, or other suitable means, and is bent so that the other end thereof resiliently engages the under side of a bearing member 70 fastened to the web 32 by a rivet 72 or other suitable means. In this manner, the latch 56 is constantly urged into latching position by the spring 66, and the bearing member 70 provides a fixed bearing surface for the end of the spring 66 rather than permitting the end of spring 66 to bear against the under surface of the cross bar 20.

A reversible channel-shaped stop member 73 is also affixed to the under side of the web 32 of the extrusion 26 by the rivet 72 and has downwardly extending legs 74 and 75 spaced unequal distances from the rivet 72. When the stop 73 is positioned as illustrated in FIGURE 2, the end fitting can telescope outwardly to the left until the leg 74 engages a nut 76 projecting inwardly from the under side of the cross bar 20 and secured thereto by a bolt 78. Likewise, the end fitting 22 can telescope to the right until the leg 75 engages the nut 76. However, when the stop 73 is reversed so that the leg 74 is in the position shown in broken lines, the end fitting 22 cannot telescope relative to the cross bar body 20 because the leg 74 engages the nut 76 to prevent outward movement of the end fitting and the reinforcing beads 40 engage the end of the cross bar body to prevent movement of the end fitting. By this simple expedient, the same end fitting with the same stop member 73 can serve as either the fixed or telescoping end fitting for the cross bar body.

The spring-loaded latch 56 normally rests in a vertical position, as illustrated in FIGURE 2, so that the hook portion 60 overlaps the flange 16 of the support member 12 to prevent the removal of the cylindrical projections 62 from the holes 64. It will be observed that the hook portion 60 engages the end of the flange 16 at a point to the right of the axis of the pin 54 so that the line of action of the force created when the hook portion engages the flange 16 will pass to the right of the axis of the pin 54. This tends to pivot the latch 56 in a clockwise direction as viewed in FIGURE 2 and hence toward operative or latching position. To disengage the end fitting from the support member 12, the latch 56 is simply pivoted in a counterclockwise direction against the action of the spring 66 until the hook portion 60 clears the flange 16 to permit the cylindrical projections 62 to be removed from the holes 64.

It is also apparent that when the end fitting is attached to the support member, the hook portion 60 will be pivoted to the right by the flange 16 to enable the projections 62 to be inserted in the holes 64 after which the spring 66 will automatically urge the hook beneath the flange 16 into latching position. The angled lower left corner of the hook 60 as viewed in FIGURE 1 serves as a cam surface for pivoting the latch to the right when it is lowered against the edge of the flange 16.

In order to insure that the cross bar will have sufficient strength, the telescoping end fitting 22 is of a length such that even in its fully extended position it extends within the cross bar sufficiently to insure adequate strength. Further, the channel-shaped members 30 and 46, plate 48, stop 73, and bearing member 70 may be made of steel or other tough metal to provide greater strength and better wearing characteristics at the most critical points without appreciably adding to the weight of the end fitting.

Referring to FIGURES 7 through 10, another form of the invention is illustrated wherein an end fitting 80 is made from the H-sectioned extrusion 26 as previously described but the channel-shaped member 30 and 46 are not provided and the upwardly extending legs of the extrusion 26 are not cut off as at 52 of FIGURE 1, but they are notched as at 86 so as to engage the end of the cross bar body to limit inward telescoping of the end fitting. The downwardly extending legs of the extrusion 26 are cut off at 28 as previously described to provide the necessary clearance for engaging the flange 16. With this construction the upwardly extending legs of the extrusion 26 provide the support for the flanged pin 54 in a more economical manner.

As most clearly illustrated in FIGURE 9, a U-shaped member 82 made of steel, for example, is fastened beneath the web 32 of the extrusion 26 with the legs thereof extending upwardly to provide a buffer plate for the end of the end fitting which will withstand greater wear and abuse. A plate 84 is fastened on top of the web 32 to provide additional material for threads to receive the threaded end of the pins 34 having the cylindrical projections 62 projecting downwardly therefrom as previously described.

The remaining components of the end fitting 80 are the same as those previously described with the exception that grooves 88 are formed on either side of the extrusion 26 when it is extruded as illustrated in FIGURE 10. The grooves 88 provide a relief at the corners of the web 32 when the downwardly extending legs of the extrusion 26 are cut off as at 28 so that the legs of U-shaped member 82 can extend upwardly without interference at the corners as illustrated in FIGURE 9. Shoulders 89 are also formed in the web 32 of the extrusion 26 when it is extruded to provide a slot for receiving the stop member 73 in a manner to prevent its rotation.

From the above description, it is apparent that the end fitting 80 functions in the same manner as the end fitting 22 but is simpler in construction with fewer parts, and is consequently less expensive to manufacture.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A cargo bracing bar for attachment to a supporting surface extending substantially parallel to the bar, said bar including an elongated bar body having a recess in one end thereof, an end fitting, means on one end of said end fitting for releasably engaging said supporting surface, the other end of said end fitting telescopically mounted within said recess, removable stop means mounted on the side of said bar body and projecting into said recess, and reversible stop means mounted on the end fitting adjacent the other end thereof for reversal between first and second positions relative to said end fitting, said reversible stop means being disposed when in said first position to co-operate with said removable stop means to hold said end fitting in a first or retracted position relative to said bar body, and said reversible stop means being disposed when in said second position to cooperate with said removable stop means to permit telescopic movement of said end fitting outwardly relative to said bar body recess from said retracted position to an extended position and to prevent such movement beyond said extended position.

2. The subject matter as claimed in claim 1 wherein said reversible stop mean comprises a channel-shaped member adapted to be mounted on the end fitting in either of two positions in one of which the legs thereof are disposed on opposite sides of said removable stop means to permit limited telescopic movement of said end fitting relative to said bar body and in the other of which one of the legs of said channel-shaped member is disposed closely adjacent said removable stop means, when the end fitting is at the inward limit of its movement, to hold the end fitting against movement longitudinally of the bar body in a direction outwardly of said recess.

3. The subject matter as claimed in claim 1 wherein said removable stop means comprises a nut secured within said recess by a bolt passing through the wall of the bar body.

4. A tubular cargo bracing bar for attachment to a supporting surface extending substantially parallel to the bar, said bar including an elongated bar body having a recess in one end thereof, an end fitting comprising an elongated member having an H-shaped cross section, means on one end of said end fitting for releasably engaging said supporting surface, the other end of said end fitting being slidably disposed within said recess, removable stop means mounted on the side of said bar body and projecting inwardly of said recess and between a pair of legs of said elongated member, and a channel-shaped stop member having the web thereof affixed to the web of said elongated member with the legs thereof spaced longitudinally on opposite sides of said removable stop means, each of said legs being adapted to engage said removable stop means to limit the telescoping action of the end fitting relative to said bar to the distance between said legs.

5. The subject matter as claimed in claim 4 wherein said elongated member is extruded with a shallow longitudinally extending slot on the surface of the web thereof facing said removable stop means, and the web of said channel-shaped stop member is disposed within said slot to prevent rotation of said stop member.

6. A tubular cargo bracing bar for attachment to a supporting flange having apertures spaced therealong extending substantially parallel to the bar, said bar including an elongated bar body having a recess in one end thereof, an end fitting comprising an elongated member having an H-shaped cross section with one end thereof telescopically mounted within said recess and portions of the legs on the other end thereof cut away so that only the web projects therefrom, a first channel-shaped member having the web thereof engaging the under side of said projecting portion with the legs thereof extending upwardly, a second channel-shaped member mounted within the first member with the legs thereof fixed to the legs of the first member and the web thereof engaging the upper surface of said projecting portion, means for connecting said projecting portion and the webs of said first and second members together, said means including portions projecting downwardly from the web of said first member for engaging apertures in said supporting flange, and latch means mounted between the legs of said members for releasably engaging the under side of said supporting flange.

7. A cargo bracing bar for attachment to a supporting surface extending substantially parallel to the bar comprising a rectangular tubular bar body having pads extruded therewith at the four interior corners thereof, an H-sectioned end fitting, means on one end of said end fitting for releasably engaging said supporting surface, the other end of said end fitting being telescopically mounted within the end of said bar body, the ends of the legs of the H-sectioned end fitting being supported in sliding relationship upon said pads, removable stop means on the side of said bar body projecting inwardly of said bar body between a pair of said legs, and reversible stop means mounted on the web of the end fitting adjacent said other end thereof and adapted to engage the removable stop means to limit telescoping action of the end fitting relative to the bar.

8. A tubular cargo bracing bar for attachment to a supporting flange extending substantially parallel to the bar and having apertures spaced therealong, said bar including an elongated bar body having a recess in one end thereof, an end fitting comprising an elongated member having an H-shaped cross section with one end thereof telescopically mounted within an end of said bar body and portions of the legs on the other end thereof cut away so that only the web projects therefrom, a first channel-shaped member having the web thereof engaging the under side of said projecting portion with the legs thereof extending upwardly, portions of the legs of said first member overlying the upwardly extending legs of said elongated member, said portions having downwardly extending skirts which overlie the downwardly extending legs of the elongated members, a second channel-shaped member mounted within the first member with the web thereof engaging the upper surface of said projecting portion, means for connecting said projecting portion and the webs of said first and second members together, said means including a portion projecting downwardly from the web of said first member for engaging said apertures in said supporting flange, and latch means mounted between the legs of said first and second members for releasably engaging the under side of said supporting flange.

9. The subject matter as claimed in claim 8 including a strengthening bead formed in said portions of the legs of said first member to reinforce the end fitting, and means for fastening said portions and skirts to the legs of the H-shaped member.

10. A tubular cargo bracing bar for attachment to a supporting flange extending substantially parallel to the bar and having apertures spaced therealong, said bar including an elongated bar body having a recess in one end thereof, an end fitting comprising an elongated member having an H-shaped cross section with one end thereof adapted to be telescopically mounted within an end of said bar body and portions of the legs on the other end thereof cut away so that only the web projects therefrom, a first channel-shaped member having the web thereof engaging the under side of said projecting portion with the legs thereof extending upwardly, portions of the legs of said first member overlying the upwardly extending legs of said elongated member, said portions having downwardly extending skirts which overlie the downwardly extending legs of the elongated members, a second channel-shaped member mounted within the first member with the web thereof engaging the upper surface of said projecting portion, means for connecting said projecting portion and the webs of said first and second members together, said means including a portion projecting downwardly from the web of said first member for engaging said apertures in said supporting flange, a shaft supported between the legs of the first and second members, a latch extending through aligned apertures in the webs of the first and second members and said projecting portions and having the upper end thereof pivotally mounted on said shaft, the lower end of said latch having a hook portion and the latch being movable to a latching position for engaging the under side of said supporting flange, and spring means for normally urging said latch into said latching position.

11. The subject matter as claimed in claim 10 including a bearing member fixed to said elongated member, and wherein said spring means comprises a spring having one end fastened to the upper end of said latch and the other end engaging said bearing member.

12. A tubular cargo bracing bar for attachment to a supporting flange extending substantially parallel to the bar and having apertures spaced therealong, said bar including an elongated bar body having a recess in one end thereof, an end fitting comprising an elongated member having an H-shaped cross section with one end thereof telescopically mounted within said recess and the downwardly extending legs on the other end thereof cut away, a U-shaped member engaging the under side of the web of said elongated member adjacent the cut-away portions of the downwardly extending legs with the legs thereof extending upwardly, means connecting said U-shaped member to said web and projecting downwardly therefrom for engaging said apertures in said supporting flange, and latch means mounted between the upwardly extending legs of the elongated member for releasably engaging the under side of said supporting flange.

13. A tubular cargo bracing bar for attachment to a supporting flange extending substantially parallel to the bar and having apertures spaced therealong, said bar including an elongated bar body having a recess in one end thereof, an end fitting comprising an elongated member having an H-shaped cross section with one end thereof telescopically mounted within said recess and the downwardly extending legs on the other end thereof cut away, a U-shaped member engaging the under side of the web of said elongated member adjacent the cut-away portions of the downwardly extending legs with the legs thereof extending upwardly, a reinforcing plate engaging the upper surface of said web adjacent said other end of the elongated member, stud means passing through the U-shaped member and the web of the elongated member and threadably engaging said reinforcing plate to connect them together, said stud means including a cylindrical head projecting from said U-shaped member for engaging said apertures in said supporting flange, and latch means mounted between the upwardly extending legs of the elongated member for releasably engaging the under side of said supporting flange.

14. The subject matter as claimed in claim 13 wherein the elongated member is extruded with longitudinally extending grooves on the outer surface of each of the flanges thereof adjacent the web thereof, and the downwardly extending legs on said other end are cut away up to the grooves to provide relieved corners for eliminating interference with the inside corners of the U-shaped member.

15. A tubular cargo bracing bar for attachment to a supporting surface extending substantially parallel to the bar, said bar including an elongated bar body having a recess in one end thereof, an end fitting comprising an elongated member having an H-shaped cross section, means on one end of said fitting for releasably engaging said supporting surface, the other end of said end fitting being slidably disposed within said recess, removable stop means mounted on the side of said bar body and projecting inwardly of said recess and between a pair of legs of said elongated member, and a channel-shaped stop member having the web thereof affixed to the web of said elongated member with the legs thereof spaced longitudinally on opposite sides of said removable stop means, each of said legs being adapted to engage said removable stop means to limit the telescoping action of the end fitting relative to said bar to the distance between said legs, the web of said channel-shaped stop member being affixed to the web of said elongated member at a point closer to one of the legs thereof than the other whereby said stop member can be reversed longitudinally so that only one leg engages the removable stop means to limit telescoping action of the end fitting outwardly of the bar body.

16. A cargo bracing bar for attachment to a support, said bar including an elongated bar body member having a recess in one end thereof, an end fitting including an end fitting body member, means on one end of said end fitting body member for releasably engaging said support, the other end of said end fitting body member being telescopically received in said recess, means adjustable for selectively holding said end fitting in a substantially fixed retracted position relative to said bar body member or providing for limited telescopic movement of said end fitting relative to said bar body member between said retracted position and an extended position, said last named means comprising fixed stop means mounted on one of said members and disposed within said recess, movable stop means adjustably mounted on the other of said members and disposed within said recess for adjustment between first and second positions, said movable stop means being disposed when in said first position to co-operate with said fixed stop means to prevent movement of said end fitting from said retracted position in a direction toward said extended position, and said movable stop means when in said second position being disposed to co-operate with said fixed stop means to prevent movement of said end fitting beyond said extended position in a direction away from said retracted position.

17. The combination defined in claim 16 including co-operating means on said end fitting and on said bar body member preventing movement of said end fitting beyond said retracted position in a direction away from said extended position.

References Cited in the file of this patent

UNITED STATES PATENTS

| | | |
|---|---|---|
| 2,555,515 | Slater | June 5, 1951 |
| 2,608,420 | Eck | Aug. 26, 1952 |
| 2,769,404 | Dietrichson | Nov. 6, 1956 |
| 2,806,436 | Johnston | Sept. 17, 1957 |
| 2,817,549 | Fahland | Dec. 24, 1957 |
| 2,836,131 | Nampa et al. | May 27, 1958 |
| 2,837,039 | Schueder | June 3, 1958 |